3,054,221
OPAL, 96% SILICA GLASS AND METHOD OF PRODUCTION
Thomas H. Elmer, Painted Post, N.Y., assignor to Corning Glass Works, Corning, N.Y., a corporation of New York
No Drawing. Filed Sept. 4, 1958, Ser. No. 758,903
8 Claims. (Cl. 49—77)

This invention relates to high silica glasses produced in accordance with the teachings of Patent No. 2,106,744 to Harrison P. Hood and Martin E. Nordberg and Patent No. 2,303,756 to Martin E. Nordberg and Harold E. Rumenapp. It is more particularly concerned with the production of translucence or opacity in such glasses and to opal glasses and glass articles thus produced.

According to the Hood et al. patent, a glass composed of over 94% $SiO_2$ can be produced by melting and shaping an easily meltable glass of lower silica content, thermally treating the glass to separate it into two phases, one of which is composed essentially of soluble, non-siliceous constituents, and extracting this soluble phase by leaching in dilute acid. This leaves a highly siliceous structure retaining its original shape and having a multiplicity of intercommunicating, submicroscopic pores which may be closed by subsequent heat treatment to produce a non-porous, transparent glass.

The Nordberg et al. patent teaches that such a glass may be colored by impregnating the porous glass, prior to the consolidation step, with a solution of an inorganic coloring agent such as a metal salt. The latter also teaches that, with high concentrations of colorant, the consolidated glass may be a colored opal glass rather than a colored transparent glass.

High silica glasses produced in accordance with the methods of these patents are known in the art as "96% silica glasses," and this general designation is here used with that meaning. It will be understood that the term is used in a generic sense to include all glasses produced in accordance with such methods, irrespective of the exact silica content of the ultimate glass or glass article.

Glasses of this type are particularly well adapted to purposes requiring high thermal shock resistance and/or involving elevated temperatures as high as on the order of 1,000° C. In some instances a degree of translucence or opacity is also needed. In particular, it has recently been proposed to employ a glass of this type in the production of heating unit covers or plates for electric ranges. This requires a dense white opal glass capable of completely hiding a heating element while at the same time harmonizing with white enamels used on such ranges.

The production of such an article presented rather serious problems. It was initially necessary to find a material capable of producing the desired type of opal coloration in a 96% silica glass. Once certain opacifying agents were found that might be satisfactory colorwise, it was discovered that, under the influence of heat, they reacted with the base glass and produced devitrification within the glass body. This in turn resulted in cracking of the glass. In some instances, the devitrifying tendency was so severe that cracking occurred during production of the glass plates, while in other cases the condition developed during subsequent exposure to heat.

I have now discovered a method of producing a white opal type of coloration in 96% silica glasses which obviates the problem mentioned above and wherein any desired degree of translucence or opacity may be provided. The present invention is based on such finding and contemplates the glasses and glass articles produced as well as the method of production.

The invention resides in a 96% silica type glass containing an oxide of cerium as an opacifying agent. It further resides in a method of producing such a glass, or glass article, by impregnating a conventional porous glass with a cerium salt solution, heating the impregnated glass in a reducing atmosphere at a temperature below that required to close the glass pores and thereafter consolidating the glass at a higher temperature.

Any relatively pure cerium compound, such as ceric and cerous sulfates, chlorides, nitrates and oxalates may be employed as the source of opacifying agent. The salt employed should be relatively pure since even minor amounts of impurities found in technical grade cerium salts, have been found sufficient to produce subsequent devitrification and cracking in the consolidated glass. The cerium compound may be dissolved in either water or an acid for impregnation, a nitric acid solution being particularly effective.

Any known method of introducing the solution into the pores may be employed, although immersion of the glass in the solution is generally most satisfactory where selective treatment of the surface is not a requisite. Following impregnation, the porous glass may be rinsed in water and dried to avoid uneven surface effects. Thereafter the glass is heated to a temperature of 900 to 1100° C. It is held at such temperature for about a half hour in the presence of a reducing atmosphere to effect optimum reduction of the cerium compound for opacifying purposes. At temperatures below 900° C. the reduction step is generally too slow to be practical. At temperatures above 1100° C. there is a tendency for the pores in the glass to close before adequate reduction occurs. The time required to obtain an optimum degree of reduction will vary somewhat depending on the particular firing temperature and reducing atmosphere selected. For any specific set of conditions, however, the optimum heating cycle may be readily determined by one skilled in this art.

Upon completion of the reduction step, the firing temperature is raised above 1100° C., and preferably to about 1250–1300° C. to effect consolidation of the glass by closing of the pores in conventional manner, that is in accordance with teachings of the prior patents. The consolidated, non-porous glass thus produced has a white translucence or opacity, the density depending on the concentration of cerium solution introduced into the glass and the corresponding concentration of cerium oxide present in the consolidated glass.

By way of further illustrating the invention and the manner in which it may be practiced, the following specific examples are set forth.

Ten glass plates, each approximately six millimeters in thickness, were formed from a borosilicate glass of the type described in the previously mentioned Hood et al. patent. The plates were heat treated to effect phase separation in the glass and then leached in a nitric acid solution to remove the soluble glass phase, thereby producing a porous glass structure in the plates. These various steps are not described in detail since they were performed in accordance with conventional practice based on the patent teachings. The remaining porous glass was composed of about 96% $SiO_2$, 3% $B_2O_3$, 0.4% $RO_2+R_2O_3$ (chiefly $Al_2O_3$) and traces of $Na_2O$ and $As_2O_3$.

The porous plates were dried, and, thereafter, each plate was immersed for a period of two minutes in a one normal nitric acid solution of $Ce(NO_3)_3 \cdot 6H_2O$. A different solution was used for each plate with the concentrations progressively increasing from 0.2 gram of the cerium salt per five ml. of acid to fifteen grams of the salt per five ml. of acid. At the end of two minutes each plate was impregnated to a depth of about one milliliter for each surface. For complete impregnation a longer time on the order of 30 minutes would be required, the exact time depending on solution viscosity.

The plates were thereafter rinsed and dried. They were then heated in air to 900° C. at which temperature they were transferred to a hydrogen atmosphere furnace and heated to 1,000° C. The plates were held at this temperature for about twenty minutes to effect the desired reduction of the cerium salt. They were then heated to 1275° C. in about thirty minutes and held at that temperature for ten minutes to completely consolidate the porous glass.

The following table sets forth the degree of opal coloration in each plate in terms of appearance of the glass. Each plate is identified by the concentration of the impregnating solution used to produce it (shown in grams of $Ce(NO_3)3 \cdot 6H_2O/100$ mls. of 1 N $HNO_3$) and by the calculated percent cerium oxide in the plate (calculated as cerium from the amount of solution absorbed and the solution concentration).

Table

| Concentration | Percent Ce | Appearance |
|---|---|---|
| 300 | 9.7 | Dense white opal. |
| 200 | 8.1 | Do. |
| 100 | 5.5 | Do. |
| 60 | 3.8 | Do. |
| 40 | 2.8 | White opal. |
| 32 | 2.2 | Do. |
| 20 | 1.4 | Pale opal. |
| 12 | 0.9 | Translucent. |
| 8 | 0.6 | Do. |
| 4 | 0.3 | Faint translucence. |

It will be seen from the above table that the degree of opacity or translucence may be varied virtually at will. On the basis of these results, at least 2% cerium is required to produce an opal of sufficient density to completely obscure from view an object such as a range unit. While higher concentrations increase the opal density somewhat, the change is small and the expansion coefficient of the glass increases. Accordingly, a concentration of about 3% cerium appears optimum for most dense opal applications.

In the above example a pure hydrogen atmosphere was used for reduction purposes. However, commercial reducing atmospheres, including 92% $N_2$–8% $H_2$, cracked ammonia, and a cracked natural gas containing about 13% $H_2$, have also been successfully used and are generally more practical for commercial purposes than is pure hydrogen.

What is claimed is:

1. An opal, non-porous glass consisting essentially of a 96% silica glass and an oxide of cerium as the opacifying agent.

2. A glass in accordance with claim 1 in which the cerium oxide content, calculated as cerium, is at least 2%.

3. A glass in accordance with claim 1 in which the cerium oxide content, calculated as cerium, is about 3%.

4. A shaped glass article composed of the glass of claim 1.

5. A method of making an opal, 96% silica glass which comprises impregnating a leached, porous, 96% silica glass with a cerium compound that is thermally decomposable to cerium oxide, heating the impregnated glass in a reducing atmosphere at a temperature below the porous glass consolidation temperature to form a reduced oxide of cerium within the glass and thereafter heating the glass at a higher temperature to effect consolidation of the porous glass into a non-porous glass consisting essentially of the 96% silica glass and the reduced oxide of cerium as the opacifying agent.

6. A method in accordance with claim 5 wherein the impregnating material is a solution composed of a nitrate of cerium dissolved in nitric acid.

7. A method in accordance with claim 5 wherein the impregnated glass is heated in a hydrogen-containing atmosphere.

8. A method in accordance with claim 5 wherein the impregnated glass is heated in a reducing atmosphere at a temperature of 900°–1100° C. to form the reduced oxide of cerium.

References Cited in the file of this patent

UNITED STATES PATENTS

| | | |
|---|---|---|
| 2,303,756 | Nordberg et al. | Dec. 1, 1942 |
| 2,332,423 | Zwermann | Oct. 19, 1943 |
| 2,387,454 | Marisic | Oct. 23, 1945 |
| 2,612,727 | Nordberg | Oct. 7, 1952 |
| 2,683,666 | Duncan | July 13, 1954 |

OTHER REFERENCES

Colored Glasses, Glass Industry, May 1945, page 236.